Sept. 2, 1947.   L. P. FRIEDER ET AL   2,426,926
HEMISPHERICAL PARACHUTE CANOPY
Filed Dec. 11, 1941   5 Sheets-Sheet 1
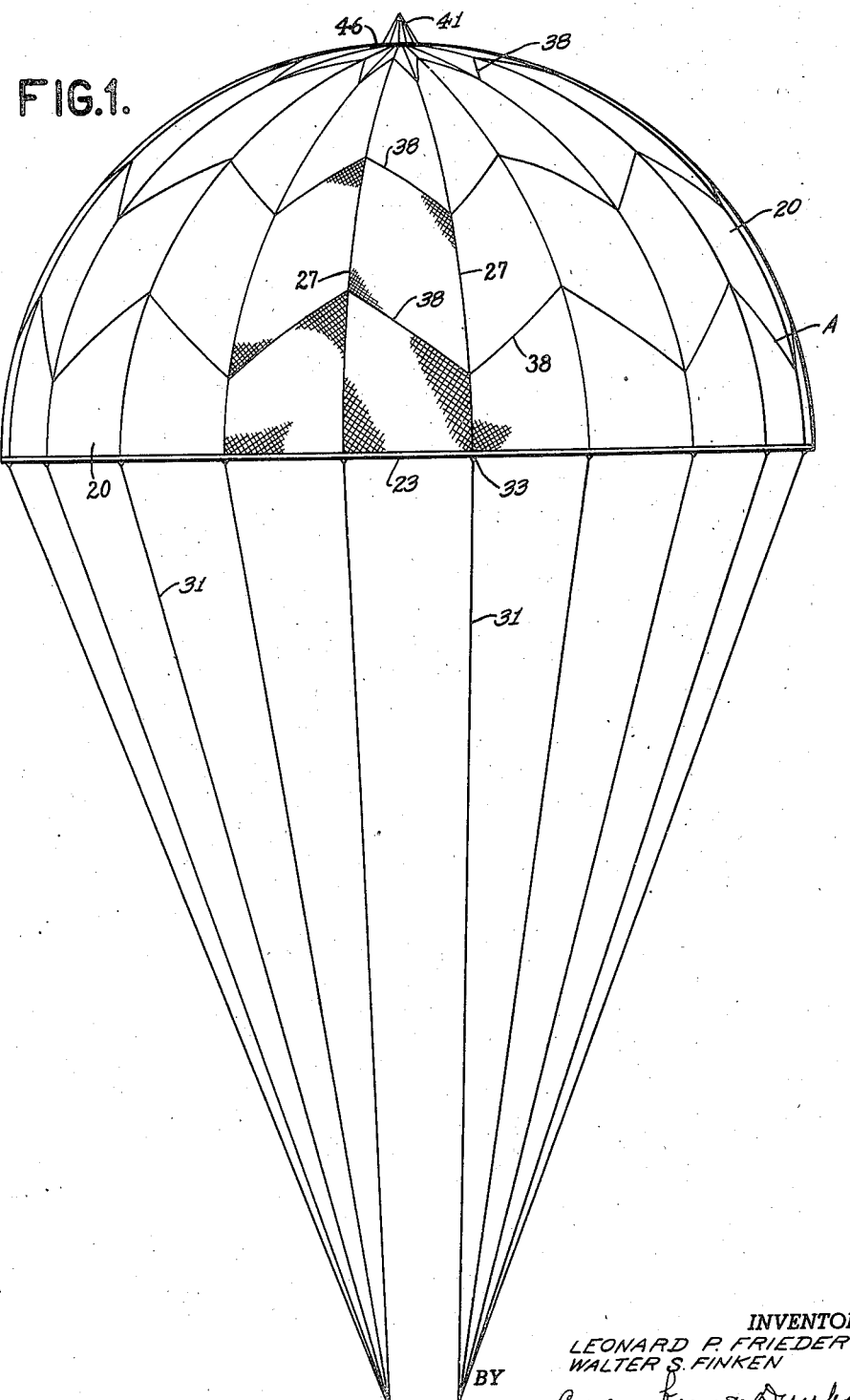
INVENTORS
LEONARD P. FRIEDER
WALTER S. FINKEN
BY Cooper, Kerr & Dunham
ATTORNEYS

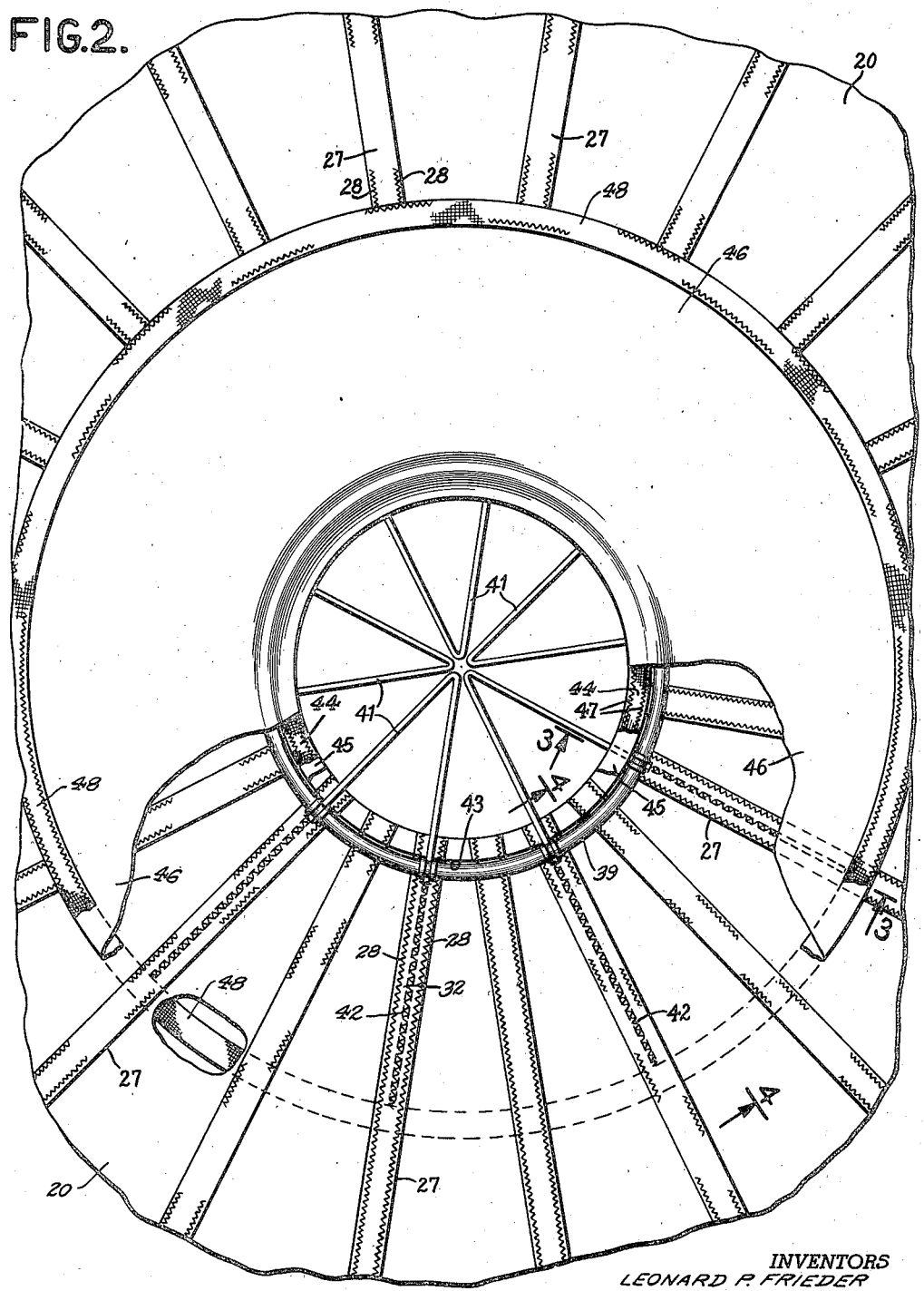

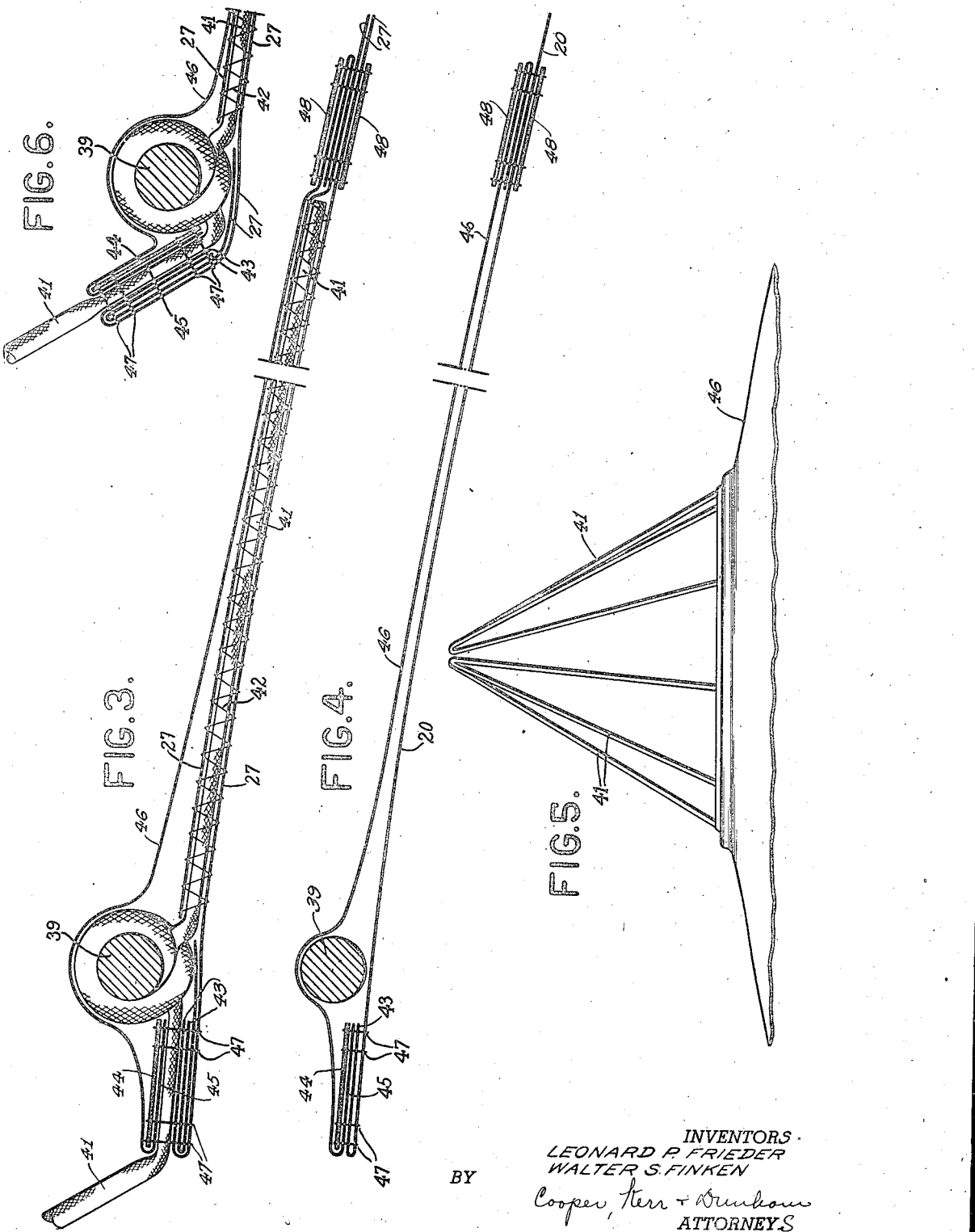

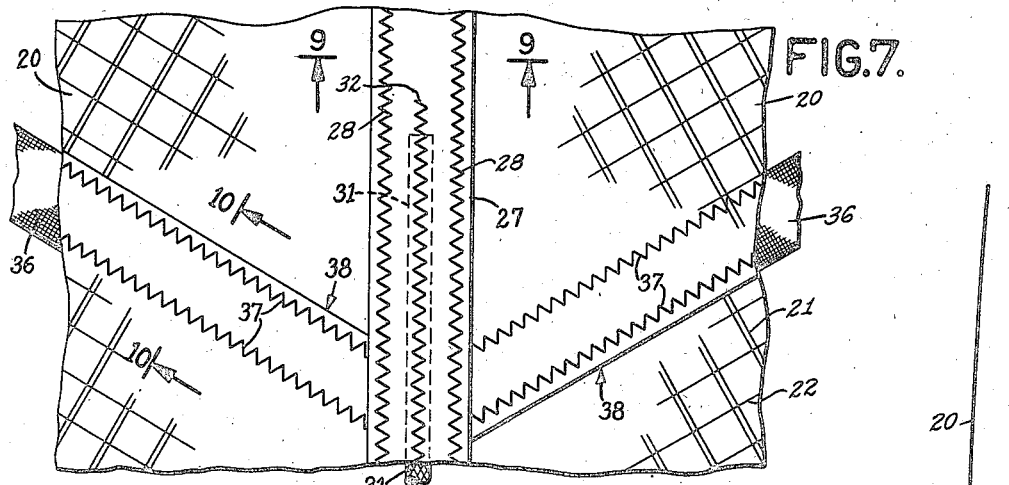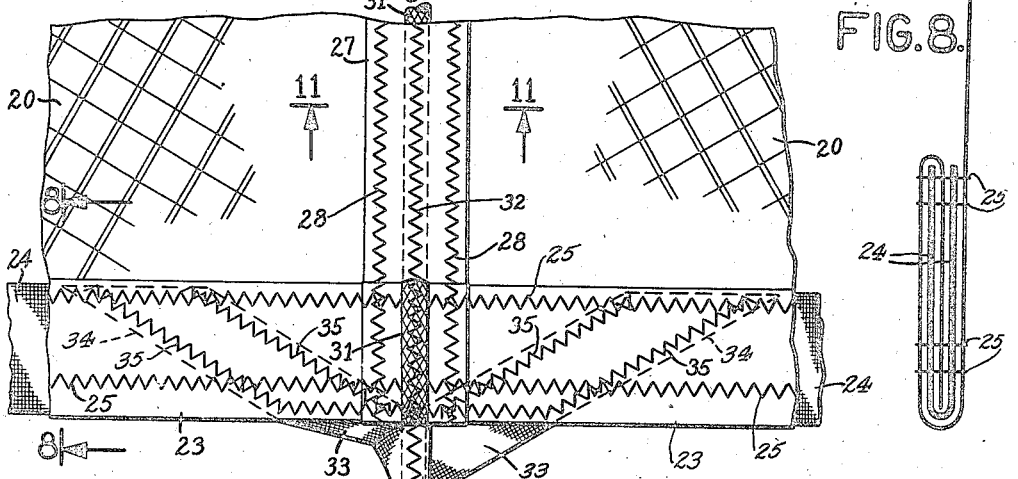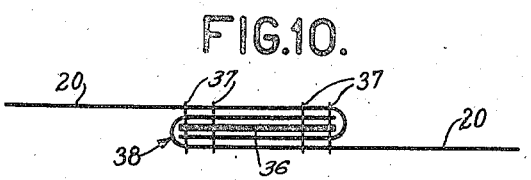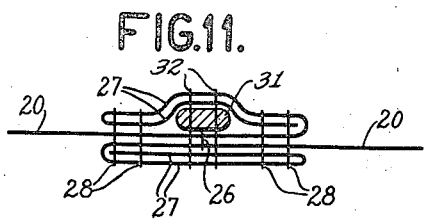

Sept. 2, 1947.  L. P. FRIEDER ET AL  2,426,926
HEMISPHERICAL PARACHUTE CANOPY
Filed Dec. 11, 1941  5 Sheets-Sheet 5
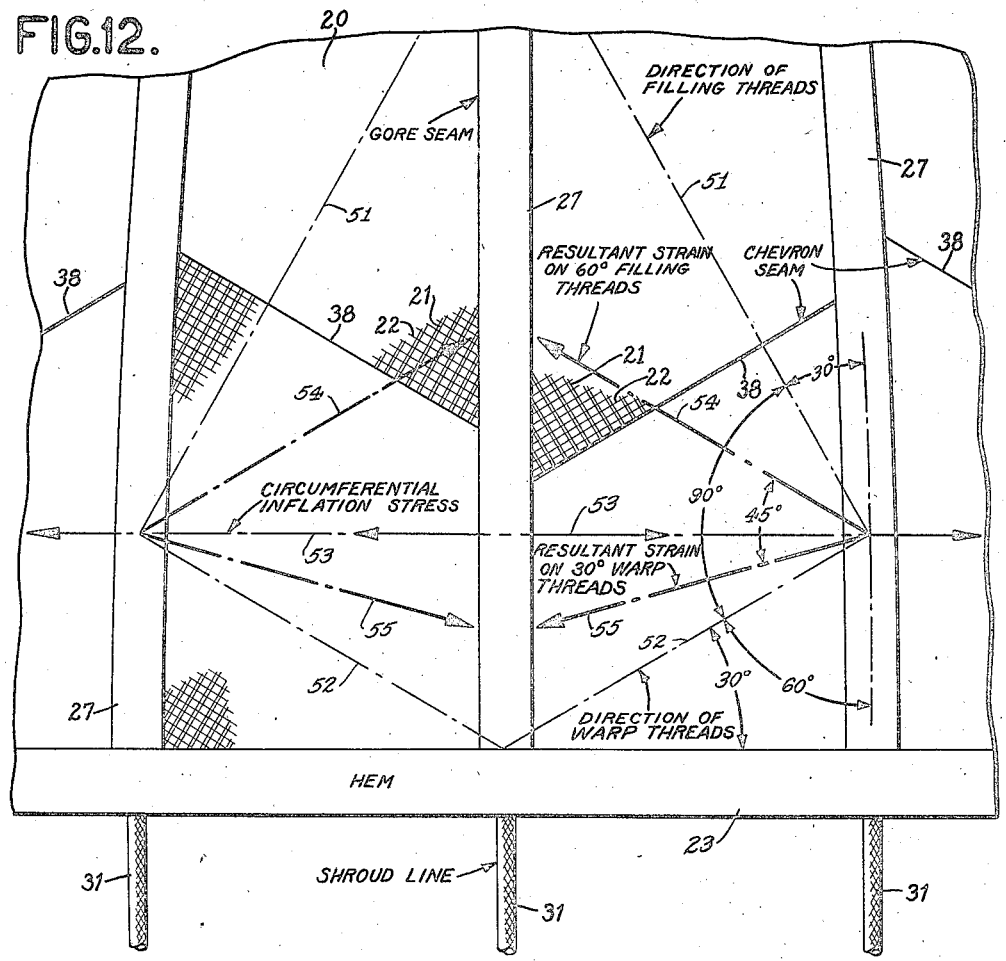
INVENTORS
LEONARD P. FRIEDER
WALTER S. FINKEN
BY
Cooper, Kerr + Dunham
ATTORNEYS Patented Sept. 2, 1947

2,426,926

UNITED STATES PATENT OFFICE 2,426,926

HEMISPHERICAL PARACHUTE CANOPY

Leonard P. Frieder, New York, and Walter S. Finken, Brooklyn, N. Y.; said Finken assignor to said Frieder Application December 11, 1941, Serial No. 422,570

5 Claims. (Cl. 244—145)

This invention relates generally to parachutes, and has particular reference to parachutes which are used under such conditions that they must quickly assume and safely lower heavy loads, although the improvements may incidentally be employed in making parachutes for substantially all uses.

A main object of the invention is to provide a parachute which will open more quickly than prior parachutes, and with greater certainty. Streaming of the parachute, i. e. failure to expand after release, is prevented by the construction of the supporting sail or canopy as hereinafter set forth. In addition to the high safety factor, or as a result, there is the advantage, among others, of permitting the parachute to be used safely from lower altitudes than prior parachutes, a feature which is of particular importance, for example, in landing troops from airplanes without exposing them for any considerable length of time to enemy gun fire.

Another object is to provide a parachute which will quickly assume heavy loads when released without shock to the load, and in which strains imposed when the parachute opens and assumes its load are so distributed as to prevent damage to the structure.

Another object is to provide a parachute which will lower its load with a minimum of oscillation and with a minimum of drift. An incidental result is that the parachute may be guided during its descent by manipulating the shroud lines in the manner common with prior parachutes, but the guiding may be more accurately effected than with the prior structures.

Another object is to provide a structure of the canopy or sail in which strains are distributed among the threads of the fabric in such a way as to prevent localized stresses which might cause damage to the fabric.

Other objects are to provide an improved air vent in the canopy; to provide an improved means for connecting the shroud lines to the canopy of the parachute; to provide a means of reinforcing the canopy at certain points where sudden stresses may make reinforcement desirable; and to provide a new arrangement of the shroud lines relative to the canopy which contributes materially to the advantages of the improved parachute.

With the foregoing and other objects and advantages in view, the invention consists in a novel construction of parts, and relative arrangements of parts, the novel features of which are pointed out in the claims appended hereto, and embodiments of which are hereinafter described with reference to the drawings accompanying and forming a part of this specification.

In said drawings:

Fig. 1 is a diagrammatic showing of the improved parachute.

Fig. 2 is a top plan view of the center of the canopy or sail showing particularly the construction of the vent and the shroud lines to which a pilot chute may be attached.

Fig. 3 is a section on a larger scale along the line 3—3 of Fig. 2.

Fig. 4 is a section on a larger scale along the line 4—4 of Fig. 2.

Fig. 5 is a side view of the shroud lines for the pilot chute and some of the details of the construction around the vent.

Fig. 6 is the same as the corresponding part of Fig. 3 with the parts in the position assumed when the parachute is descending under load.

Fig. 7 is a top plan view showing the construction of the circumferential or marginal hem, one of the gore seams, the method of attaching the shroud lines and the method of constructing the diagonal reinforcements used in the larger parachutes.

Fig. 8 is a section along the line 8—8 of Fig. 7.

Fig. 9 is a section along the line 9—9 of Fig. 7.

Fig. 10 is a section along the line 10—10 of Fig. 7.

Fig. 11 is a section along the line 11—11 of Fig. 7.

Fig. 12 is a stress diagram illustrating how loads are imposed and distributed upon the woven fabric of the canopy or sail.

The parachute in the drawings is what is generally referred to as a man saving parachute to distinguish it from chutes used for other purposes. However, nearly all of the features of construction are not limited to any particular type or size of parachute but will contribute importantly to efficiency and safety if used in the construction of parachutes for other purposes such as dropping arms, supplies, signals or in fact nearly all purposes where parachutes have a function.

The load supporting surface 20 is constructed of woven fabric of suitable porosity and may have the rip stop construction disclosed by Fisher Patent No. 1,786,838. That fabric has reinforcing threads 21 and 22 at right angles in the fabric which also serve to limit to comparatively small surfaces any tear or rupture in the fabric.

The canopy or sail 20 is composed of gores which are cut on lines corresponding to the meridian lines of a hemisphere. When sewed together the structure will give a supporting surface which will assume and maintain a hemispherical shape when descending under load. Tests of parachutes constructed according to this invention have demonstrated that this structure is surprisingly effective in preventing the streaming of the sail; that is, failure to open when it is released with a load attached. This is due in part to the fact that when such a sail is packed or released the hemispherical structure always leaves what might be termed "puckers" in the fabric instead of the fabric folding in flat surface-to-surface contact as with the prior chutes.

Around the edge of the canopy or sail is a reinforced hem designated generally as 23 which contributes to the certainty of opening as well as preventing tears at the hem. This hem is illustrated in Figs. 7 and 8. It consists of folds in the fabric of what will for convenience be referred to from now on as the canopy. An inextensible tape 24 is interfolded with the fabric of the canopy as illustrated in Fig. 8 and the assemblage is then stitched as at 25. This construction provides a strong and inextensible seam which has the further advantage of not folding flat in packing so that it will always present a ruffled appearance when the chute is folded and packed.

The gores are, as before indicated, cut upon curved lines corresponding to the meridian lines of a hemisphere. The material of the gores is first laid with the edges in overlapping contact and then stitched together longitudinally as indicated at 26 in Fig. 9. The material along the edge of each gore is then doubly folded upon itself as illustrated at 27 and the edges of the folds are then stitched through the six plies of fabric as indicated at 28. The stitches 28 are of the zig-zag type which, while serving to hold the fabric firmly in the seam, permit yielding of the seam structure when the load is applied to the canopy. In other words, the seams joining the gore sections together will yield in any direction in response to loads applied thereby giving the canopy as a whole an elasticity which it would not otherwise have.

The shroud lines 31 are preferably composed of silk or other suitable material and will yield and recover because of their construction. The preferred shroud lines are constructed according to Frieder Patent 2,282,717. The preferred way of attaching the shroud lines is to insert them between the folds of fabric along the gore seams as shown in Fig. 11 and then secure them in the seam by the same sort of zig-zag or elastic stitching 32 as is used in fastening the gore sections together. The connection between the shroud lines 31 and the canopy 20 are strengthened or reinforced by employing a construction such as shown in the lower part of Fig. 7. An inextensible tape 33 is wrapped or tied around the shroud line 31 adjacent the margin of the seam 23 and is extended upward on diagonal lines 34 to the inner edge of the hem 23. The stitches 32 may extend down through the knot or fold in the reinforcing tape 33 and in addition the ends of the tape 33 are sewed into or against the marginal hem by stitches such as shown at 35.

In the parachute illustrated the gores are not single pieces of fabric but are composed of sections sewed together along diagonal lines. The seams connecting these sections together are for convenience hereinafter referred to as "chevron" seams because of their angle or appearance. In constructing these seams the pieces composing the gores are folded together as illustrated in Fig. 10, the folds surrounding or encompassing a reinforcing tape 36. The folds and tape are then secured together by stitches 37. This gives a strong seam which is taken advantage of in reinforcing the canopy structure at a point where such reinforcement is needed and, in addition, the chevron seams provide definite and strong stops for any tears in the fabric of the canopy. The chevron seams are designated generally by the numeral 38 in Fig. 1 of the drawings.

Experience has demonstrated that when the canopy opens the greatest outward stresses are imposed on a circumferential line parallel to the hem of the canopy and at a distance from the hem equal to about one-third of the total distance from the hem to the center of the canopy. The chevron seams are therefore so arranged as to have one circumferential line of the chevron seams crossing back and forth through this area. This particular line of chevron seams is designated A in Fig. 1 of the drawing.

For some uses if the fabric of the canopy has the right porosity a vent may not be necessary. However, in the parachute illustrated in the drawing such a vent is provided. It includes a ring or grommet 39 which may be extensible or inextensible, the latter being preferred. This ring 39 defines the vent and is used for attaching the shroud lines of a pilot chute to the main chute. The construction is illustrated in Figs. 2 to 6 inclusive. The grommet 39 is above the plies of fabric in the gore seams and those seams are perforated to receive the shroud lines 41 of the pilot chute. As shown particularly in Figs. 3 and 6, the shroud lines 41 are secured by a clove hitch around the ring and their ends are extended between the plies of the gore seams and are secured by stitches 42 corresponding to the stitches 28 used for making the gore seams.

Within the grommet 39 the material of the gores is folded outward as shown at 43 in Figs. 3 and 6. Also within the grommet 39 is a reinforcing tape 44 and a fold 45 of a shielding member 46 composed of fabric. The seam or hem within the grommet is secured by circular rows of stitches 47. The shield 46 is in effect a circular disk of fabric which extends out to any desired distance on the upper surface of the canopy. Its purpose is to cover and shield the grommet and shroud lines from being caught and to a certain extent it also contributes to a better air flow through the vent. When the parachute is descending under load the construction within the grommet assumes the positions shown in Fig. 6. The shield 46 serves to a certain extent to prevent air eddies around the grommet and associated parts which might damage the center of the canopy.

The shield 46 is secured at its outer edges in a reinforced seam which includes the gore material, a fold of the shield 46 and two reinforcing tapes 48, one within and the other on the outside of the canopy. This seam holds the shield against displacement and serves also to reinforce the canopy at some distance away but around the vent of the canopy.

As before stated, it is preferred to use the fabric of Fisher Patent No. 1,786,838. In cutting the fabric preparatory to constructing the canopy the cutting is done so as to insure distribution of load taking and supporting stresses in such a way that the threads of the fabric are never subjected to direct endwise strains. In prior constructions one set of threads extended radially of the canopy and the other circumferentially or, in what is usually referred to as bias cut, the two sets of threads were at 45° angles to any radial line or to any circumferential line of the canopy. While the bias cut was an improvement and had advantages, the strains were imposed upon the threads in such a way that there was endwise strain, particularly where the edges of the fabric were secured in inextensible gore seams. In the present construction this is avoided by having the warp threads and the weft threads so disposed that the threads have a relative adjustment to receive and distribute the load. This is done by cutting the fabric in such a way that the threads have what may for convenience be termed a "hunting" action in adjusting themselves to the load. One construction which has been found very satisfactory is to have the warp threads (they may be the weft threads in the fabric) at an angle of about 60° to any circumferential line (corresponding to lines of latitude on a hemisphere) on the hemispherical canopy and the other set of threads at an angle of about 30° to such circumferential line. This construction and the operation is illustrated in Fig. 12. In that figure the disposition of the threads is shown in relation to the gore seams. The direction of the weft threads (called filling threads on the drawing) is indicated by the line 51, Fig. 12, and the warp threads by the line 52. When the canopy is expanded under load the circumferential inflation stress indicated by the line 53 is distributed between the two sets of threads in such a way as to resolve the resultant strain on lines which are at angles to either the warp or the weft threads. In Fig. 12 this resultant strain on the weft or filling threads is indicated by the line 54 and the resultant strain on the warp threads is indicated by the line 55. As will be perceived, the lines 54 and 55 cross both the warp and the weft threads at angles to the threads and this results in distributing the circumferential inflation stress upon both sets of threads when the canopy is fully expanded by its opposition to the descent of its load. The opening stresses will cause the relative adjustment of the threads which has been referred to as a hunting action occurring before the load is fully applied to the fabric. The angles specifically mentioned are not to be construed as the only ones which can be used to get the results indicated, as the effect can be obtained but not as efficiently by angles differing from the ones mentioned.

The shroud lines 31 and, if desired, the shroud lines 41 for the pilot parachute may (as before indicated) be of the construction disclosed in Frieder Patent 2,282,717. The shroud lines employed with the hemispherical construction of the canopy should, experience indicates, be at least as long as the diameter of the canopy when fully expanded. For some purposes a longer shroud line seems to have advantages in the way of increased stability as distinguished from oscillation or swaying in descent although the difference is not great enough to make it clear that the longer shroud lines are an essential feature.

Parachutes constructed according to the foregoing have been tested under various conditions including drop tests from an airplane and tests in which a man dropped from an airplane with the new parachute. The drop tests were made with dummy weights of from 178 to 600 pounds and the lapse of time from the first appearance of the pilot chute out of the pack until the parachute was opened was timed by skilled observers. The elapsed time in each instance was about one and three-fifths seconds. The maximum rate of descent was reached at the end of that period. In the tests made by a man the shock to the man upon the opening of the parachute was very slight and the side slip or direction control by manipulating the shroud lines was easily carried out. The maximum rate of descent was, as before stated, reached when the parachute was fully opened and this, together with the comparatively low rate of descent makes it possible to use the parachute safely from airplanes flying as low as 300 feet; in fact, it can be used from airplanes at lower altitudes with almost certain safety. This quick opening is believed to be due to the fact that when the new hemispherical canopy is collapsed it offers a flabby surface to air currents and this flabby surface makes it impossible to seal the inside surfaces of the canopy one to the other thereby making it certain that air can get into the interior of the canopy and it also permits the force of suction or vacuum to pull on the outside of the canopy much more efficiently than with prior parachutes. This quick opening is, as above indicated, facilitated by the nature of the hem around the edge of the canopy.

In all of these tests and in subsequent use, there was substantially no oscillation or swinging of the loaded parachute, a difficulty which has been quite pronounced with all prior parachutes with which the applicants are familiar. The advantages of this are apparent; that is, the load is supported without spilling the air from under the canopy so that the rate of descent is uniform and, where it is necessary for the parachutist to control the direction he may do this without his efforts being handicapped by the oscillation of the parachute and consequent spilling of the air from under the canopy. This is believed to be due to the fact that prior canopies when in use are merely distortions of a flat sail and there is, therefore, a decided tendency for the air to escape from under such canopies and it is believed that this tendency has been one of the defects of prior structures. Nothing of the kind is to be found in the new structure devised by the applicants.

Explanation of the construction and operation of the parachute in the foregoing has gone into considerable detail but it is not the desire to be limited by anything hereinabove stated except to the extent indicated by the claims which follow.

What is claimed is:

1. In a parachute, a canopy composed of gores of woven fabric sewed together along their edges, said edges being curved in such manner that the sewed canopy will assume a hemispherical shape when expanded by air resistance to its descent under load, each of said gores being composed of panels extending diagonally of the gores with the fabric of the panels cut on a bias and the panels joined together by seams, a reinforcing tape sewed in each of said panel seams and the tapes being of such lengths that their ends are secured when sewing the gores together, one of said taped panel seams in each gore crossing the center line of the gore at a distance from the bottom of the canopy equal substantially to one-third of the length of the gore.

2. In a parachute, a canopy composed of gores of fabric secured together along their edges by seams consisting of overlapping folds of the gore material held in overlapped relation by rows of stitches along the edges of the folds, an inextensible hem around the canopy consisting of folds of the gore material and a tape interfolded in said folds, said folds and tape being secured by parallel rows of stitches, shroud lines having their ends within the folds of material of the gore seams and secured by stitches through the folded material, the tape and the shroud lines, inextensible tapes wrapped around the shroud lines and having their ends secured by stitches to the inextensible hem, and stitches through the hem, shroud lines and wrapped portion of the tape.

3. In a parachute, a canopy constructed of gores of woven fabric sewed together along their margins by longitudinally and laterally yieldable seams, the gores having their edges curved in such manner that when sewn together the canopy will assume a hemispherical shape when descending under load, a vent in the center of the canopy comprising a grommet, a circular hem within the grommet including material of the gores and a reinforcing tape, a fabric shield secured at its inner edge in said seam and extending over the grommet to the surface of the canopy, circumferential rows of stitches holding the outer margin of the shield in position on the canopy and reinforcing tapes secured along said margin by said stitches.

4. In a parachute, a canopy constructed of gores of woven fabric sewed together along their margins by longitudinally and laterally yieldable seams, the gores having their edges curved in such manner that when sewn together the canopy will assume a hemispherical shape when descending under load, a vent in the center of the canopy comprising a grommet, a circular hem within the grommet including material of the gores and a reinforcing tape, a fabric shield secured at its inner edge in said seam and extending over the grommet to the surface of the canopy, circumferential rows of stitches holding the outer margin of the shield in position on the canopy, reinforcing tapes secured along said margin by said stitches and shroud lines for a parachute secured to said grommet and having their ends secured in the gore seams.

5. In a parachute, a canopy constructed of gores of woven fabric sewed together along their edges, the gores having their edges curved in such manner that when sewn together the canopy will assume a hemispherical shape when inflated by air resistance when descending under load, a vent in the center of the canopy comprising a ring to which the upper ends of the gores are secured, a fabric member within the ring so constructed as to provide an expandable air escape opening above and having an internal diameter less than the internal diameter of the ring, and a fabric shield secured at one edge to the outer surface of the canopy and extending loosely over said ring with its other edge secured around the escape opening in the aforesaid fabric member.

LEONARD P. FRIEDER.
WALTER S. FINKEN.

REFERENCES CITED

The following references are of record in the file of this patent:

UNITED STATES PATENTS

| Number | Name | Date |
|---|---|---|
| 1,412,800 | Cooper | Apr. 11, 1922 |
| 1,427,772 | Ball | Sept. 5, 1922 |
| 1,849,965 | Switlik | Mar. 15, 1932 |
| 2,134,362 | Frieder | Oct. 25, 1938 |
| 1,025,386 | Ensslin | May 7, 1912 |
| 1,353,131 | Ruff | Sept. 14, 1920 |

FOREIGN PATENTS

| Number | Country | Date |
|---|---|---|
| 678,946 | France | Jan. 2, 1930 |
| 250,330 | Italy | Sept. 28, 1926 |
| 442,978 | France | Sept. 13, 1920 |

OTHER REFERENCES

Publication (German) Luftfahrt-Forschung, 1938, vol. 15, No. 12, pages 577–582.